United States Patent [19]

Kavehrad et al.

[11] Patent Number: 4,672,658
[45] Date of Patent: Jun. 9, 1987

[54] SPREAD SPECTRUM WIRELESS PBX

[75] Inventors: Mohsen Kavehrad, Holmdel, N.J.; Peter J. McLane, Kingston, Canada

[73] Assignee: AT&T Company and AT&T Bell Laboratories, Murray Hill, N.J.

[21] Appl. No.: 921,837

[22] Filed: Oct. 23, 1986

Related U.S. Application Data

[63] Continuation of Ser. No. 788,061, Oct. 16, 1985, abandoned.

[51] Int. Cl.$^4$ .................... H04M 11/00; H04Q 7/04; H04J 13/00; H04L 27/30
[52] U.S. Cl. ......................... 379/63; 379/61; 375/1; 375/7; 370/19
[58] Field of Search ................... 370/18, 19; 375/1, 7; 379/58, 60, 61, 63; 455/38

[56] References Cited

U.S. PATENT DOCUMENTS

| | | | |
|---|---|---|---|
| 4,112,257 | 9/1978 | Frost | 179/2 EB |
| 4,291,409 | 9/1981 | Weinberg et al. | 375/1 |
| 4,455,454 | 6/1984 | Umebayashi | 179/2 E |
| 4,538,028 | 8/1985 | Gazzoli et al. | 179/2 EA |
| 4,561,089 | 12/1985 | Rouse et al. | 370/18 |

OTHER PUBLICATIONS

Freret et al., Proceedings of NTC, Jun. 1980, pp. 69.7.1–69.7.4.

Turin, IEEE Jnl. on Sel. Topics in Comm., Vol. SAC-2, Aug. 1984, pp. 597–603.

Primary Examiner—Gene Z. Rubinson
Assistant Examiner—Mark E. Ham
Attorney, Agent, or Firm—David R. Padnes; Erwin W. Pfeifle

[57] ABSTRACT

The present invention relates to a wireless PBX network wherein direct sequence spread spectrum multiple access is used for voice and data communications to support a plurality of local-local and local-external calls. The present wireless PBX arrangement comprises a plurality of local user transceivers using a first separate unique chip sequence patterns for information communication and a second common chip sequence pattern for call-set up; and a central PBX comprising (a) a plurality of PBX transceivers, each of which uses a separate first chip sequence pattern which is matched to a corresponding local user transceiver; (b) a switching means for interconnecting local users to each other or to an external network via the associated PBX transceivers; and (c) a call set-up receiver responsive solely to initial call set-up information sent by any user using the second common chip sequence pattern. Optional selection diversity or equal gain combining diversity and/or error correction encoding may also be included in the transceivers.

23 Claims, 8 Drawing Figures

SPREAD SPECTRUM WIRELESS PBX

This application is a continuation of application Ser. No. 788,061, filed Oct. 16, 1985, now abandoned.

BACKGROUND OF THE INVENTION

1. Technical Field

The present invention relates to a wireless multiple access local area spread spectrum communications network, and, more particularly, to a wireless spread spectrum arrangement supporting a plurality of simultaneous private communications through a central private branch exchange (PBX) that serves to connect a plurality of local users to each other as well as to an external communications network.

2. Description of the Prior Art

A PBX network reduces the number of lines required between a group of local users and a remote communications exchange while supporting a certain number of simultaneous network accesses. Each PBX network makes use of an associated private branch exchange (PBX) functioning as an intermediary routing or switching device, which connects the local users with each other as well as with an external network. Calls made to or from the local network must first access the PBX, which then routes the call to its destination.

Wireless multiple access communications networks have been successfully implemented in certain applications. For example, a mobile radio system simultaneously routes a plurality of private communications through a central base station which performs the switching necessary to interconnect the appropriate users, utilizing, for example, frequency shift keying (FSK) modulation and frequency division multiple access (FDMA). In this regard see, for example, U.S. Pat. No. 4,112,257 issued to E. G. Frost on Sept. 5, 1978. Another radio system is the satellite-based communications system described in U.S. Pat. No. 4,291,409 issued to A. Weinberg et al. on Sept. 22, 1981, wherein a central switching arrangement, phase shift keying (PSK) modulation and spread spectrum multiple access (SSMA) are used.

In a paper by P. Freret et al. entitled "Applications of Spread-Spectrum Radio to Wireless Terminal Communications" in *Proceedings of NTC*, Nov. 30–Dec. 4, 1980, Houston, Texas, Vol. 4, pp. 69.7.1–69.7.4, a multi-user wireless indoor communications system is disclosed, which features PSKSSMA and a central, but non-switching arrangement, supporting bidirectional radio transmissions between a local computer terminal user and a central computer. The use of diversity in such system to combat multipath interference is also suggested.

A demand presently exists for the flexibility and convenience of a wireless PBX network; unfortunately, all current PBX networks require physical interconnection. Several previously unsolved problems have precluded the evolution of wireless PBX networks. To begin with, the indoor office environment is particularly hostile to wireless multiple access communication, presenting especially aggravated multipath fading and multi-user interference problems. Moreover, many multiple access techniques that have been used for other wireless applications, such as Time Division Multiple Access (TDMA) and Frequency Division Multiple Access (FDMA) are difficult to implement and call for additional complex circuitry. The Spread Spectrum Multiple Access technique, whose random multiple access capability permits simple implementation, has been found to tolerate only a low number of simultaneous users in a distributed controlled network, heretofore rendering it impractical for local area network applications. In this regard see, for example, G. L. Turin's article "The Effects of Multipath and Fading on the Performance of direct-Sequence CDMA Systems," in IEEE Journal on Selected Topics in Communications, Aug. 1984, Vol. SAC-2, pp. 597–603.

The problem remaining in the prior art is to provide a wireless PBX network, wherein the problems of multipath fading and multiuser interference are substantially alleviated.

SUMMARY OF THE INVENTION

The foregoing problem in the prior art has been solved in accordance with the present invention which relates to a wireless PBX network, and, more particularly, to a wireless PBX network that uses the technique of direct sequence binary spread-spectrum multiple access.

It is an aspect of the present invention to provide a wireless PBX network wherein direct sequence spread spectrum multiple access is used for voice and data communications to support a plurality of local and local-external network calls. More particularly, the wireless PBX arrangement comprises a plurality of local user transceivers which are individually connected to a separate local user of the PBX network, and a central PBX including a plurality of PBX transceivers and a switching means. Each of the local user transceivers are matched to a separate one of the PBX transceivers, the matched pair of transceivers using a unique direct sequence spread spectrum code sequence for effecting private bidirectional communications therebetween. The PBX switching means functions to interconnect (a) two PBX transceivers for local calls or (b) a PBX transceiver and the external network for calls destined or originating outside the PBX network.

Other and further aspects of the present invention will become apparent during the course of the following description and by reference to the accompanying drawings.

BRIEF DESCRIPTION OF THE DRAWINGS

Referring now to the drawings in which like numerals represent like parts in the several views.

DETAILED DESCRIPTION

Figure 1:
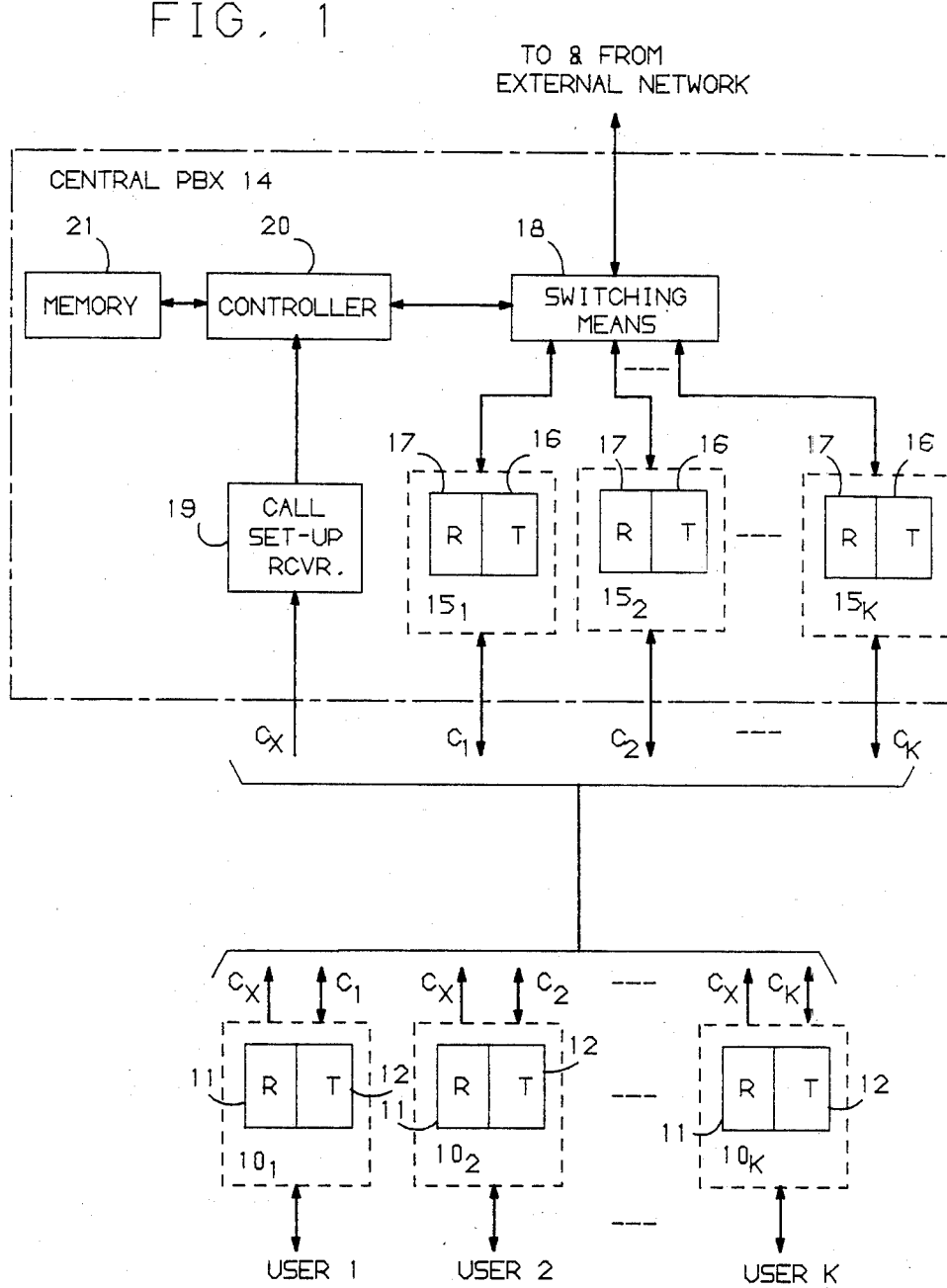
FIG. 1 is a block diagram of a preferred embodiment of the wireless PBX network in accordance with the present invention.

FIG. 1 shows a wireless PBX network comprising a plurality of separate local user transceivers $10_1$–$10_k$, each local user transceiver $10_i$ comprising a transmitter 11 and a receiver 12; and a central PBX 14 which provides interconnections between local users and/or connects local users to an external communications network. PBX 14 is shown as comprising (a) a plurality of PBX transceivers $15_1$–$15_k$, each of which comprises a transmitter 16 and a receiver 17; (b) a switching means 18 that interconnects local users to each other or to the external communications network; and (c) a call set-up receiver 19 that is responsive solely to brief call set-up information sent by any user transceiver $10_1$–$10_k$ at the onset of a call. Each of the PBX transceivers $15_1$–$15_k$ is matched to a corresponding user transceiver $10_1$–$10_k$, respectively, to form a matched pair of transceivers $10_i/15_i$ which communicate between each other using a uniquely encoded direct sequence spread spectrum signal. More particularly, receiver 17 of PBX transceiver $15_1$ only processes the uniquely encoded direct sequence spread spectrum signals received from transmitter 11 of user transceiver $10_1$ and rejects other uniquely encoded dirert sequence spread spectrum signals received from other user transmitters 11 of user transceivers $15_2$–$15_k$. Similarly, receiver 12 of user transceiver $10_1$ is responsive solely to the uniquely encoded direct sequence spread spectrum signals transmitted by transmitter 16 of PBX transceiver $15_1$ and rejects other uniquely encoded direct sequence spread spectrum signals from all other transmitters 16 of transceivers $15_2$–$15_k$.

Each transmitter 11 or 16 functions to accept a digital information bit stream and encode it with a predetermined unique communicating spread spectrum chip sequence, designated as a particular one of sequences $C_1$–$C_k$, that is uniquely associated with the intended receiver 17 or 12, respectively, of the matched pair of transceivers. The encoded information bit stream is then decoded by the receiver 17 or 12 of the matched pair of transceivers that recognizes the transmission's communicating chip sequence $C_i$. Additionally, upon local initiation of a call by, for instance, user 1, transmitter 11 of user transceiver $10_1$ uses a unique call set-up spread spectrum chip sequence $C_X$, that is common to all local transmitters 11 of user transceivers $10_1$–$10_K$, designated solely for encoding and transmitting source and destination information to call set-up receiver 19 at PBX 14 for attempting to set up a call.

After decoding and demodulation of the received call set-up information by call set-up receiver 19 into appropriate control signals, these appropriate control signals are sent to a controller 20 associated with switching means 18 to either (a) check an associated controller memory 21 to see if a link is available, or (b) attempt to establish a link, between the destination user or the external communications network and the PBX transceiver $15_1$ associated with user 1 in any manner known in the switching art. If the attempt is unsuccessful—i.e. if the indicated destination is "busy" or no appropriate link can be found through switching mears 18—then transmitter 16 of the exemplary PBX transceiver $15_1$ uses the assigned communicating chip sequence $C_1$ that is unique to user 1 for transmission of a busy signal to receiver 12 of transceiver $10_1$. On the other hand, if the link attempt is successful, the appropriate switches, or gates, of switching means 18 are closed and exchange of information may proceed, wherein, for example, user transceiver $10_1$ receives a standard bit stream from user 1 and then transmits it via its transmitter 11 to receiver 17 of PBX transceiver $15_1$ using the assigned unique communicating chip sequence $C_1$. The routing of this standard bit stream then proceeds through switching means 18 either to the external communications network or to another local user, in which latter case the standard bit stream would be switched to the PBX transmitter $15_i$ corresponding to the destination user, and the previously described wireless transmission/reception process would be repeated using the chip code $C_i$ associated with the destination user's transceiver pair. If the call were to originate in the external communications network, switching means 18, which accepts signals directly from the external communications network, would route the destination address to controller 20. Controller 20 then would attempt to find a link through switching means 18 to the specified destination user and, if a link is found, route the received standard bit stream to the PBX transmitter 17 of transceiver $15_i$ associated with the appropriate destination user.

During a call, each of the bidirectional transmissions can be sent in packets of information which include not only the encoded information originating or destined for a particular end user, but also include, for example, a short preamble comprising control information as, for example, one or more status bits indicating an on-hook or off-hook condition of the associated end user. Upon conclusion of call, the one or more status bits in each transmitted information packet may, for example, be altered at the user transceiver $15_i$, instructing switching means 18 to terminate the link and free the associated transceivers $10_i$ and $15_i$.

Figure 2:
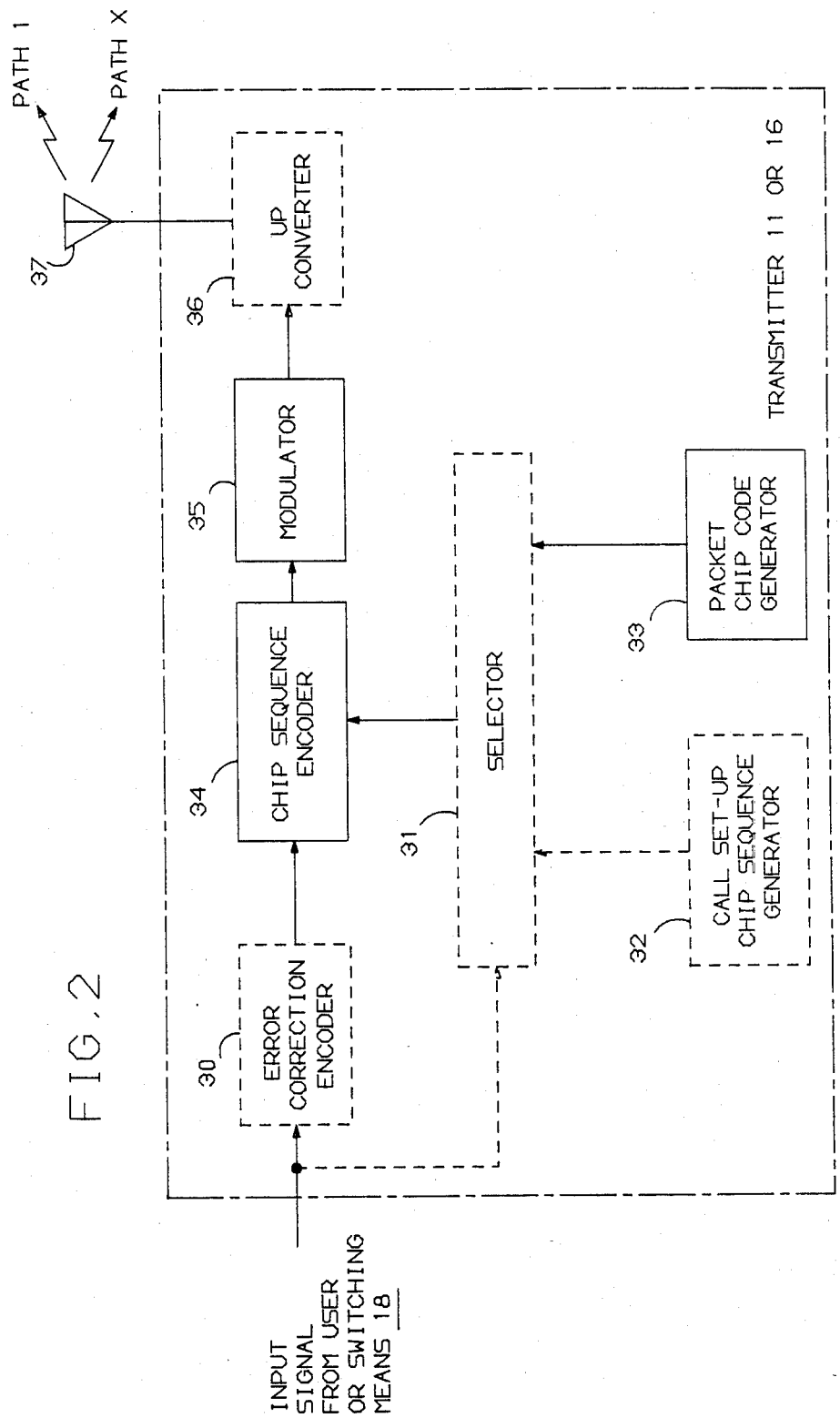
FIG. 2 is a schematic block diagram of a transmitter for use in the network of FIG. 1.

FIG. 2 shows a block diagram of a preferred arrangement of a transmitter 11 or 16. The preferred arrangement comprises an optional error correction code encoder 30, a selector 31 and a call set-up chip code generator 32 which are only found in transmitters 11 of user transceivers $10_i$, a packet chip sequence generator 33, a chip code encoder 34, a modulator 35, an optional upconverter 36 and an antenna 37. Chip sequence generators 32 and 33 each produce a unique series of shorter-duration bits or "chips" repeated over each standard communication sequence bit period. At a user transmitter 11 in a transceiver $10_i$, immediately upon initiation of a call, selector 31 functions to recognize such initiation, and select the output signal from call set-up chip sequence generator 32, which produces a chip sequence $C_x$ that is uniquely associated with call set-up receiver 19 at PBX 14, for transmission to chip sequence encoder 34. Selector 31 may be activated to select call set-up generator 32 in response to, for example, a first setting of one or more status bits in each information packet which identifies the packet as being part of the brief call set-up bit stream that is intended solely for call set-up receiver 19 at PBX 14. The call set-up information from the associated user comprising, for example, origination and destination addresses, is also sent to chip sequence encoder 34, where it is encoded using the call set-up chip code $C_x$ from generator 32 for transmission via modulator 35, upconverter 16 and antenna 37 to call set-up receiver 19 of PBX 14. Conclusion of the call set-up bit stream may then be indicated by a second setting of these status bit(s), causing selector 31 to change its selection from call set-up chip sequence generator 32 to packet chip sequence generator 33, which produces chip sequence $C_j$ that is uniquely associated with the corresponding receiver 17 in the matched PBX transceiver $15_j$ and is used for transmitting the subsequent packets of information bits from the associated user to the destination address.

Regarding the main path through transmitter 11, the same input bit stream from the associated user that controls selector 31 is also fed to optional error correction code encoder 30, which, for example, adds hamming code bits to either the call set-up information or the subsequent packets of information bits during a call. The input signal, or the output signal from optional error correction encoder 30 when present, is also transmitted to chip sequence generator 34. Chip sequence encoder 34, which is responsive to the output from the selected one of chip sequence generators 32 or 33, may be implemented with a simple MOD 2 adder to carry out its function of encoding each bit contained in either the call set-up information or a standard input packet bit stream from a user with the repetitive bandwidth-spreading chip sequence $C_x$ or $C_i$. The encoded output is then ready for modulation by any preferred technique such as binary phase-shift-keying by modulator 35 or a combination of differential encoding of the bits and binary phase modulation to provide differential phase-shift-keying modulation, which is more appropriate for operation in multipath fading office environments. The modulated signal may then be raised by optional upconverter 36 to the transmitting frequency if not already there. It is to be understood that the input signal to transmitter 11 or 16 could be at baseband, Intermediate Frequency (IF) or possibly some transmission ratio frequency.

The transmitter 16 included in a PBX transceiver $15_j$ differs from transmitter 11 in user transceiver $10_i$ in that transmitter 16 needs neither call set-up chip sequence generator 32 nor selector 31. Transmitter 16 sends information only to the receiver of its associated matched user transceiver $10_i$, so it needs only packet chip sequence generator 33 to produce the chip code uniquely associated with the associated receiver 12 in matched user transceiver $10_i$.

Figure 3:
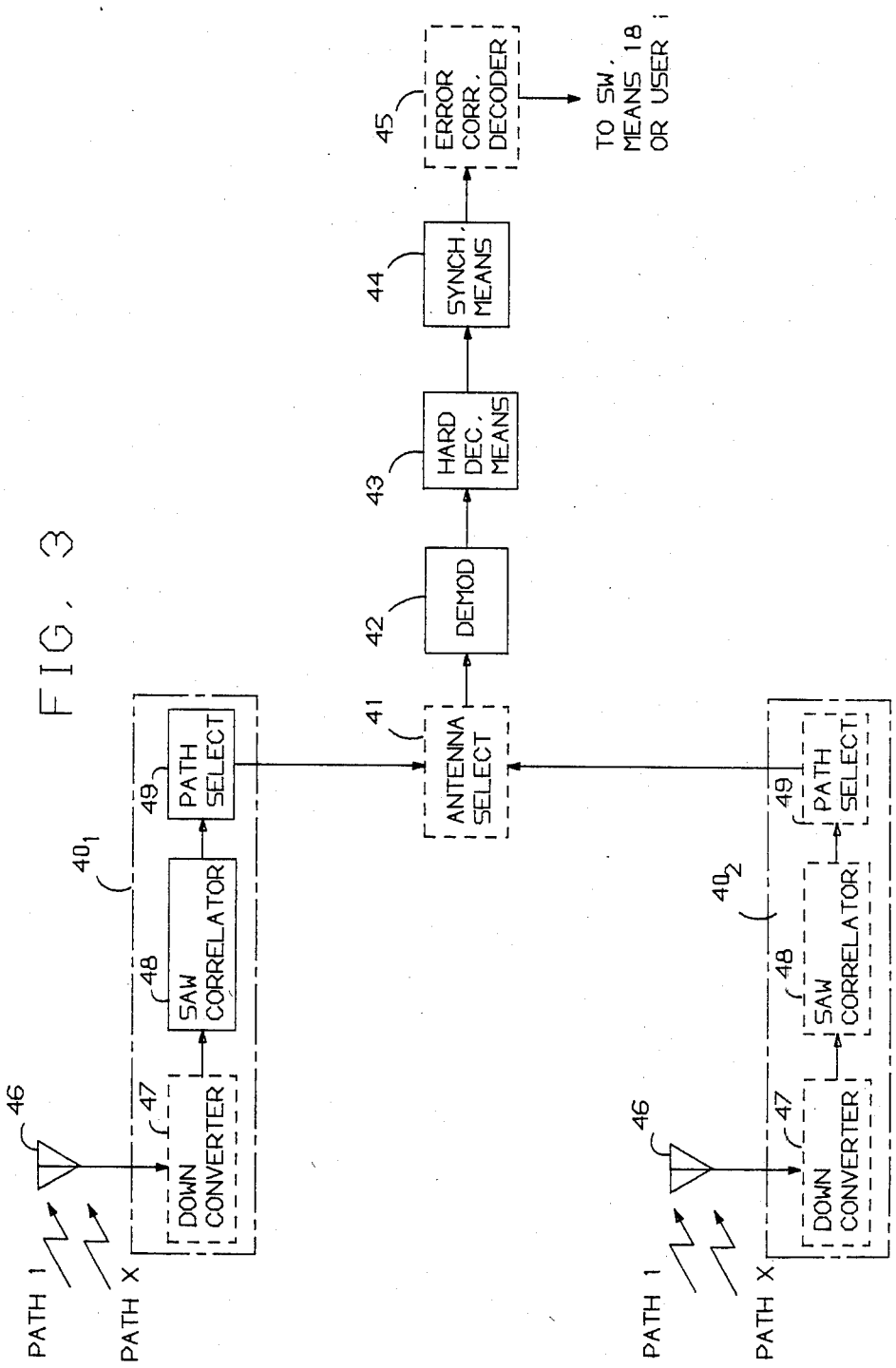
FIG. 3 is a schematic block diagram of a receiver for use in the network of FIG. 1.

Refer now to FIG. 3, which depicts a block diagram of receivers 12 or 17. The preferred embodiment comprises at least one receiver subsection 40, which substantially rejects all signals except those transmissions that are encoded and modulated with the appropriate chip sequence. Accepted signals may then be passed on to an optional antenna select means 41 which is used only in multi-antenna embodiments that make use of the performance improvement offered by selection diversity. Antenna select means 41 may be included to compare signals from each receiver subsection 40 and select the strongest one. A demodulator 42 corresponding to modulator 35 in FIG. 2 then demodulates this signal and passes it on to hard decision means 43, which resolves it into a binary bit stream. Hard decision means 43 can be implemented with, for example, a simple binary threshold comparator that outputs either a binary one or zero. Synchronization means 44 then identifies each information packet, enabling proper interpretation of transmitted information. An optional error correcting code decoder 45 is provided when the transmitter 11 or 16 includes error correcting encoder 30. Error correcting code decoder 45 acts on the binary bit stream provided at the output of synchronization means 44, making a standard bit stream available either to user "i", if FIG. 3 represents a receiver 12 at the user end, or to switching means 17 at central PBX 14 if the arrangement of FIG. 3 represents a receiver 17. Use of an error correcting code such as the Hamming or BCH codes improves performance by reducing the higher bit error rate that results from multi-user interference.

Receiver subsection $40_1$ comprises an antenna 46 which is connected to an optional downconverter 47, a surface acoustic wave (SAW) matched filter correlator 48 and a path select means 49. The optional downconverter 47 accepts exemplary radio frequency (RF) transmissions and converts them to, for example, intermediate frequency (IF) or baseband as desired. It is to be understood that the downconversion process in downconverter 47 is dependent on the input frequency. More particularly, if the input signal is, for example, 900 MHz., then downconverter 47 could downconvert directly to baseband for further processing. If, on the other hand, the input signal is, for example, in the Gigahertz range, then downconverter 47 would downconvert to IF for further processing.

Figure 4:
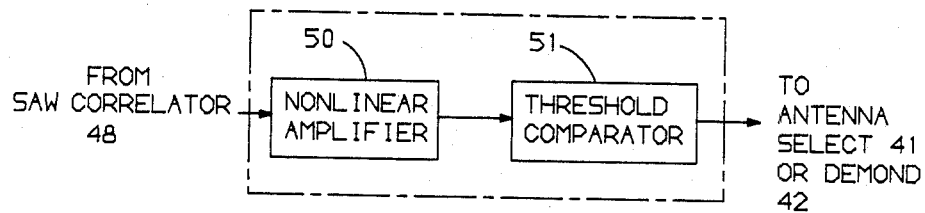
FIG. 4 is a block diagram of a path select means for use in the receiver of FIG. 3.
Figure 5:
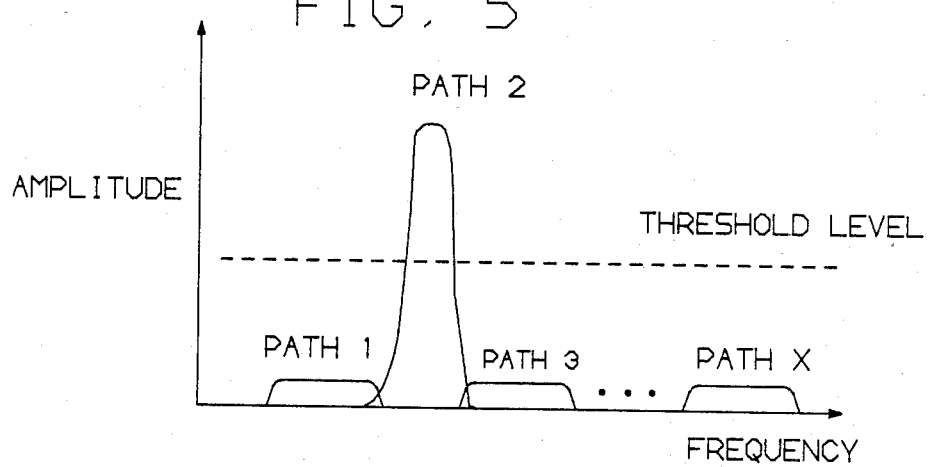
FIG. 5 is a graph of typical multipath signals as processed by the path select means of FIG. 4.

SAW matched filter correlator 48 is a device which is well known in the art and functions to process either the signal from an associated antenna 46 or demodulated signals at the output of downconverter 47 that are encoded with the one unique chip sequence that it is responsive to while substantially rejecting all other chip sequence encoded transmissions. SAW matched filter correlator 48 also strips the chip sequence from those signals it processes, providing a standard modulated bit stream at its output. Path select means 49 then compares the signals corresponding to different paths in a multipath reception at the SAW correlator output, gating out the strongest signal and suppressing the weaker ones as shown in FIG. 5. As shown in FIG. 4, path select means 49 may be implemented with, for example, a nonlinear amplifier 50, for suppressing signals from weaker paths, and a simple multilevel threshold comparator 51 for selecting the signal from the strongest path.

When selection diversity is desired to improve performance, a second receiver subsection $40_2$ is provided which comprises a separate antenna 46, exemplary RF to IF downconverter 47, SAW correlator 48, and path select means 49 as shown in FIG. 3. The various elements 46–49 of second receiver subsection $40_2$ function in the same manner as that described for receiver subsection $40_1$. Antenna select means 41 then compares the output signals from receiver subsections $40_1$ and $40_2$ and outputs the strongest signal of those two signals.

Figure 6:
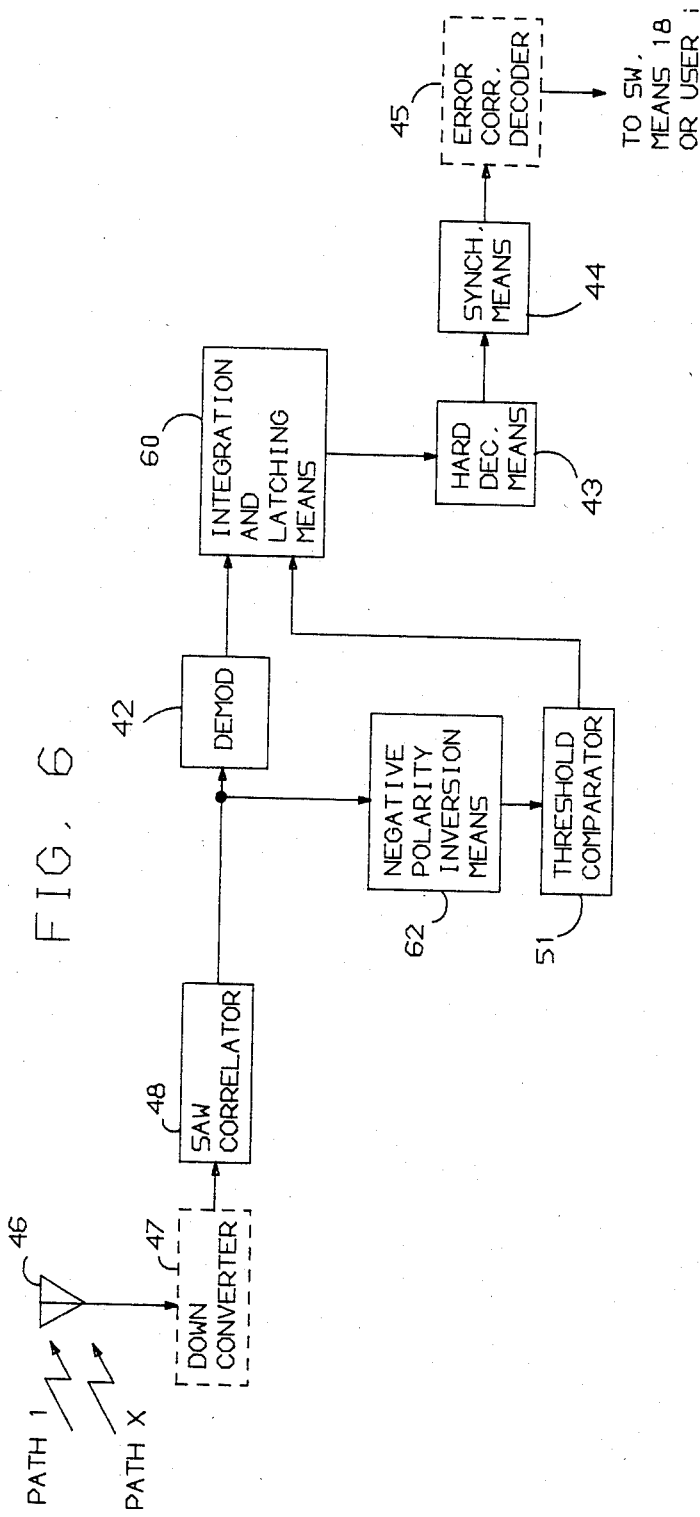
FIG. 6 is a block diagram of an alternative receiver for the structure of FIG. 3.

Refer now to FIG. 6, which presents the block diagram of an alternative receiver arrangement to that of FIG. 3. The receiver of FIG. 6 features the performance improvement afforded by equal gain combining diversity reception without the extra hardware and complexity associated with selection diversity. Antenna 46, optional downconverter 47 and SAW matched filter correlator 48 perform as do corresponding elements in FIG. 3. However, the path select means 49 of FIG. 3, as well as the additional receiver subsections $40_2$–$40_n$ required for the implementation of selection diversity are replaced by integration and latching means 60, negative polarity inversion means 62 and threshold comparator 51.

Figure 7:
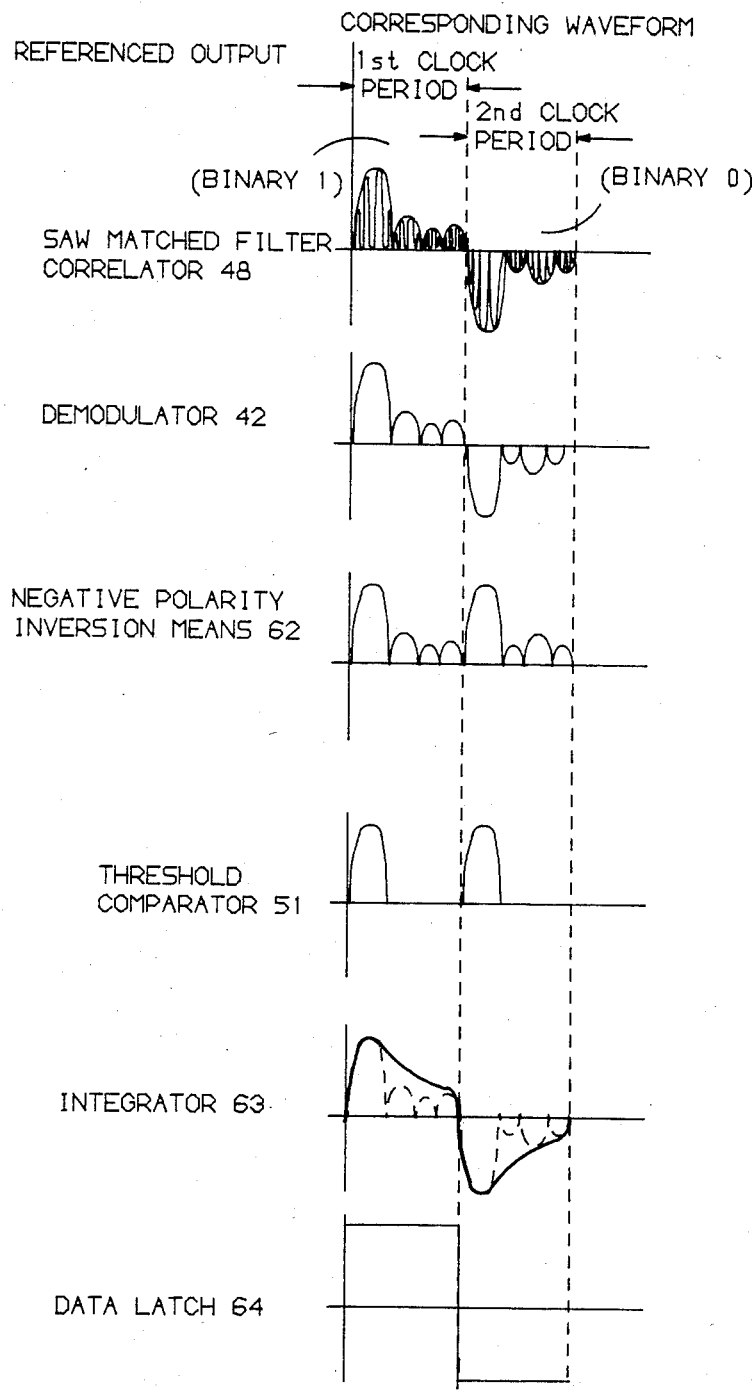
FIG. 7 shows plots describing typical signals associated with the operation of the integration and latching means used in the alternative receiver of FIG. 6.
Figure 8:
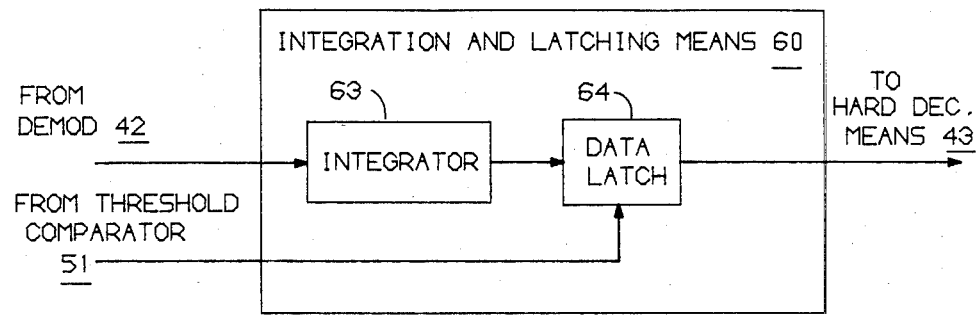
FIG. 8 is a block diagram of integration and latching means 60 for use in the receiver of FIG. 6.

Shown in FIG. 7(a) are typical multipath signal replicas present at the output of SAW matched filter correlator 48, each representing a binary 1 during the first sample clock period and a binary 0 during the second sample clock period. Diversity performance gain is achieved through the synchronous operation of integration and latching means 60, which may be implemented with an integrator 63 coupled to a data latch 64 as shown in FIG. 8. Integration and latching means 60 first integrates the energies of the demodulated multipath signal replicas from demodulator 42, which are shown in FIG. 7(b), over each period of the clock pulse from threshold comparator 51, which is shown in FIG. 7(d), yielding an integrator output as shown in FIG. 7(e), which may then be applied to clocked data latch 64. Such a latch may be realized with a simple D flip-flop, which gates out and maintains through the duration of the clock period a high signal of predetermined amplitude if the signal at the D terminal is above a certain threshold at the occurence of, for example, the rising edge of the clock; or it gates out and maintains a low signal if the signal at the D terminal is below the threshold during the clock's rising edge. The resulting signal pulses provided by data latch 64, shown in FIG. 7(f), are made available to hard decision means 43 for resolution into a baseband bit stream. This bit stream is then fed to synchronization means 44 and optional error correction decoder 45, which function as previously described in the arrangement of FIG. 3. The clock pulses of FIG. 7(d), which synchronize the operation of integration and latching means 60, are generated by first passing the SAW matched filter correlator output of FIG. 7(a) through a negative polarity inversion means 62 such as a square law detector, which inverts negative signals but does not invert positive signals, yielding a waveform as shown in FIG. 7(c). These exclusively positive signals from the output of means 62, which still include multipath signal replicas, are then fed to threshold comparator 51. Threshold comparator 51 gates out the strongest of the multipath replicas, providing the clock pulses of FIG. 7(d) to synchronize the operation of integration and latching means 60. Such synchronization enhances the ability of means 60 to combine only replicas of a given transmitted bit to form a given pulse at its output.

What is claimed is:

1. A wireless local communication system comprising:
    a plurality of separate local user transceivers, each local user transceiver comprising a transmitter and a receiver for respectively transmitting and receiving uniquely encoded direct sequence spread spectrum radio signals; and
    a central Private Branch Exchange (PBX) comprising
    a plurality of PBX transceivers, each PBX transceiver (a) being matched to a separate one of the plurality of local user transceivers to provide a separate matched pair of a local user/PBX transceiver and (b) including a separate transmitter and receiver, each transceiver of a matched pair of transceivers solely transmitting to and receiving from its matched transceiver direct sequence spread spectrum radio signals which are encoded in a manner unique to said matched pair of transceivers while substantially rejecting transmissions from any non-matched transceiver, and
    a switching means for interconnecting any one of the plurality of PBX transceivers to any other one of the plurality of PBX transceivers and/or to an external communication network, said switching means being capable of supporting a plurality of simultaneous PBX transceiver-PBX transceiver and PBX transceiver-external network interconnections.

2. A wireless local communication system according to claim 1 wherein
    the transmitters of each separate matched pair of a local user transceiver and a PBX transceiver comprise means for encoding an input digital bit stream into a unique direct sequence spread spectrum signal using a unique spread spectrum chip sequence for transmission to the receiver of the other transceiver of the matched pair of transceivers, and
    the receivers of each separate matched pair of a separate local user transceiver and a separate PBX transceiver comprise means for decoding a direct sequence spread spectrum signal received from the other transceiver of the matched pair of transceivers into a recovered digital bit stream using said unique spread spectrum chip sequence used by the transmitter of the matched transceiver.

3. A wireless local communication system according to claim 2 wherein the transmitters in the plurality of local user transceiver further comprise
    means responsive to call set-up control information including an origination and destination address received at the onset of a call from an associated end user for transmitting said call set-up control information to the central PBX in a direct sequence spread spectrum signal using a second unique spread spectrum chip sequence which is common to all said local user transmitters.

4. A wireless local communication system according to claim 3, wherein said central PBX further comprises
    a call set-up receiver which is solely responsive to call set-up control information, including origination and destination addresses, received in the direct sequence spread spectrum signal encoded with the second spread spectrum chip sequence at the onset of a call from any one of said local user transmitters for generating appropriate control signals to the switching means.

5. A wireless local communication system according to claim 4, wherein the central PBX further comprises:
    control means responsive to control signals indicating origination and destination addresses from either said call set-up receiver or the external communications network for (a) determining whether an open link exists through the switching means to interconnect the indicated origination and destination addresses, and (b) upon finding an available open link, closing said open link to connect the origination and destination users.

6. A wireless local communications system according to claims 2 or 4, wherein each of the receivers comprises:
    a surface acoustic wave (SAW) matched filter correlator, responsive to a direct sequence spread spectrum signal received via multiple paths, for providing as an output signal only the received signals encoded with a predetermined spread spectrum chip sequence associated with said receiver and substantially rejecting all other direct sequence spread spectrum signals; and
    an integration and latching means responsive to both the demodulated signal output of said SAW matched filter correlator and to a clock pulse generated from output of said SAW matched filter correlator, which integrates said demodulated signal output of said SAW matched filter over the period of each clock pulse, for gating out a single signal pulse per clock period.

7. A wireless local communication system according to claim 2 or 4, wherein each of the receivers comprises;
- a receiver subsection for receiving direct sequence spread spectrum signals which propagate via multiple paths between transceivers of the system, the receiver subsection including:
- a surface acoustic wave (SAW) matched filter correlator, responsive to a direct sequence spread spectrum signal received via multiple paths, for providing as an output signal only the received signals encoded with a predetermined spread spectrum chip sequence associated with said receiver and substantially rejecting all other direct sequence spread spectrum signals; and
- path select means responsive to an output signal from said SAW correlator for providing as an output signal only the strongest signal received from one of the multiple paths and suppressing weaker signals received in the other multiple paths.

8. A wireless local communication system according to claim 7 wherein each of the receivers further comprises:
- a plurality of said receiver subsections disposed in a parallel relationship to each other for providing diversity reception of the multiple path direct sequence spread spectrum signals; and
- means responsive to the output signals from the path select means of the plurality of receiver subsections for selecting the strongest of said output signals.

9. A wireless local communication system according to claim 2, wherein each local user transmitter and PBX transmitter comprises:
- An error correction encoding means responsive to an incoming information bit stream to be transmitted for encoding said incoming information bit stream with a predetermined error correction code.

10. A wireless local communication system according to claim 9 wherein each of the local user receivers and PBX receivers comprises:
- an error correction decoder responsive to an information bit stream from the receiver decoding means for decoding the information bit stream with a predetermined error correction code to detect and correct errors therein.

11. A Central Private Branch Exchange (PBX) for use in a wireless local communication system comprising:
- a plurality of PBX transceivers, each PBX transceivers including a seperate transmitter and receiver and receiver which are each arranged to transmit to, and receive from, a separate matched remote local user transceiver direct-sequence spread-spectrum radio, signals which are encoded in a manner unique to a matched pair of local user/PBX transceivers, while substanially rejecting transmissions from any other non-matched remote local user transceiver, and
- a switching means for interconnecting any one of the plurality of PBX transceivers to any other one of the plurality of PBX transceivers and/or to an external communications network, said switching means being capable of supporting a plurality of simultaneous PBX transceiver-PBX transceiver and PBX transceiver-external network connections.

12. A Central PBX according to claim 11 wherein the transmitter of each PBX transceiver comprises means for encoding an input digital bit stream into a unique direct sequence spread apectrum signal using a unique spread spectrum chip sequence for subsequent transmission to a receiver of a remote matched local user transceiver; and
- the receiver of each PBX transceiver comprises means for decoding a direct sequence spread spectrum signal received from a remote matched local user transceiver into a removed digital bit stream using a unique spread spectrum chip sequence used by a transmitter of the remote matched local user transceiver.

13. A Central PBX according to claim 11 wherein the Central PBX further comprises:
- a call set-up receiver which is solely responsive to call set-up control information, including origination and desination addresses, received in a direct sequence spread spectrum signal encoded with a second spread-spectrum chip sequence at the onset of a call from any one of a plurality of remote local user transmitters for generating appropiate control signals to the switching means.

14. A Central PBX according to claim 13 wherein the Central PBX further comprises:
- control means responsive to control signals indicating origination and destination addresses from either of the call set-up receiver or the external communications network for (a) determining whether an open link exists through the switching means to interconnect the indicated origination and destination addresses, and (b) upon finding available open link, closing the open link to connect the origination and destination users.

15. A Central PBX according to claims 12 or 13 wherein each receiver comprises
- a surface acoustic wave (SAW) matched filter correlator, responsive to a direct-sequence spread-spectrum signal received via multiple paths from a remote matched local user transceiver, for providing as an output signal only the received signals encoded with a predetermined spread-spectrum chip sequence associated with the receiver and substantially rejecting all other direct-sequence spread-spectrum signals and
- an integration and latching means, responsive to bothe the demodulated signal output from the SAW matched filter correlator and a clock pulse generated from the ouptut of the SAW matched filter correlator, for integrating the demodulated signal output of the SAW matched filter correlator over the period of each clock pulse and gating out a single signal pulse per clock period.

16. A Central PBX according to claim 12 or 13 wherein each receiver of the Central PBX comprises:
- a receiver subsection for receiving direct-sequence spread spectrum signals which propagate via multiple paths between remote local user transceivers and the Central PBX, the receiver subsection including:
- a surface acoustic wave (SAW) matched filter correlator, responsive to a direct-sequence spread-spectrum signal received via multiple paths, for providing as an output signal only the received signals encoded with a predetermined spread-spectrum chip sequence associated with the receiver and substantially rejecting all other direct-sequence spread-spectrum signals; and path selecting means responsive to an output signal from the SAW matched filter correlator for providing as an outptut signal only the strongest signal received from one of the multiple paths and suppressing weaker signals received in the other multiple paths.

17. A Central PBX according to claim 12 wherein each PBX receiver further comprises:

an error correction decoder responsive to an information bit stream from the receiver decoding means for decoding the information bit stream with a predetermined error correction code to direct and correct errors therein.

18. A transceiver for use in a wireless communication system, the transceiver comprising:

a transmitter including means for encoding an input digital bit stream into a unique direct-sequence spread-spectrum radio signal using a unique spread-spectrum chip sequence for subsequent transmission of the unique direct-sequence spread-spectrum radio signal to a receiver of another remote transceiver, and means responsive to call set-up control information including an origination and destination address for transmitting the call set-up control information in a direct-sequence spread-spectrum signal using a second unique spread-spectrum chip sequence; and a receiver for receiving uniquely encoded direct-sequence spread-spectrum raiio signals from ome or more remote transceivers, the receiver including means for decoding a direct-sequence spread-spectrum signal received from one of said one or more transceivers into a recovered digital bit stream using the unique spread-spectrum chip sequence used by the transmitter of the one of said one or more transceivers while substanially rejecting transmissions from any other transceiver.

19. A transceiver according to claim 18 wherein the receiver further comprises:

a surface acoustic wave (SAW) matched filter correlator, responsive to a direct-sequence spread-spectrum signal received via multiple paths for providing as an output signal only the received signals encoded with a predetermined spread-spectrum chip sequence associated with the receiver and substanially rejecting all other direct-sequence spread-spectrum signals; and an integration and latching means responsive to both the demodulated signal output of the SAW matched filter correlator and a clock pulse generated from the output of the SAW matched filter correlator, for integrating the demodulated signal output of the SAW matched filter correlator over the period of each clock pulse and gating out a single pulse per clock period.

20. A transceiver according to claim 18 wherein the receiver further comprises:

a receiver subsection for receiving direct-sequence spread-spectrum signals which propagate via multiple paths, the receiver subsection including:

a surface acoustic wave SAW matched filter correlator, responsive to a direct-sequence spread-spectrum signal received via multiple paths, for providing as an output signal only the received signals encoded with a predetermined spread-spectrum chip sequence associated with the receiver and substanially rejecting all other direct-sequence spread-spectrum signals; and path select means responsive to an output signal from the SAW correlator for providing as an output signal only the strongest signal received form one of the multiple paths and supressing weaker signals received in the other multiple paths.

21. A transceiver according to claim 19 wherein the receiver further comprises:

a plurality of the receiver subsections disposed in a parallel relationship to each other for providing diversity reception on the multiple-path direct-sequence spread-spectrum signals; and PG means responsive to the output signals from the path select means of the plurality of receiver subsections for selecting the strongest of the output signals.

22. A transceiver according to claim 18 wherein the transmitter further comprises:

an error correction encoding means to an incoming information bit stream to be transmitted for encoding the incoming information bit stream with a predetermined error correction code.

23. A transceiver according to claim 22 wherein the receiver further comprises:

an error correction decoder responsive to an information bit stream from the receiver decoding means for decoding the information bit stream with a predetermined error correction code to detect and correct errors therein.

* * * * *

UNITED STATES PATENT AND TRADEMARK OFFICE
CERTIFICATE OF CORRECTION

PATENT NO. : 4,672,658

DATED : June 9, 1987

INVENTOR(S) : Mohsen Kavehrad and Peter J. McLane

It is certified that error appears in the above-identified patent and that said Letters Patent is hereby corrected as shown below:

Col. 12, Claim 22, line 38, after "means" insert --responsive--.

Signed and Sealed this

Fifteenth Day of December, 1987

Attest:

DONALD J. QUIGG

Attesting Officer

Commissioner of Patents and Trademarks